W. R. WILLIAMS.
VEHICLE SUSPENSION.
APPLICATION FILED JAN. 22, 1912.
1,211,513.
Patented Jan. 9, 1917.
Fig. 1.
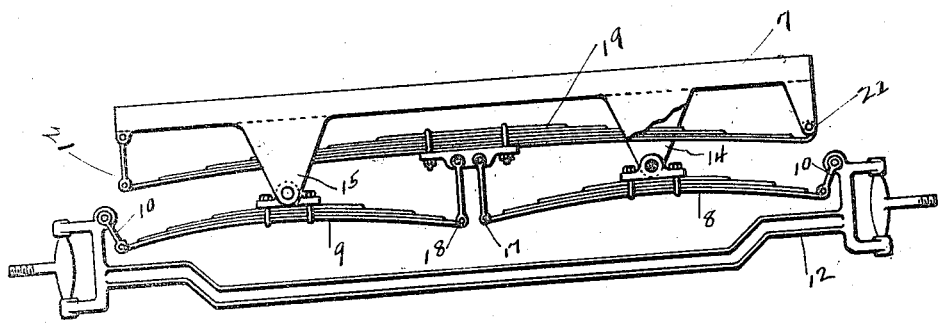
Fig. 2.
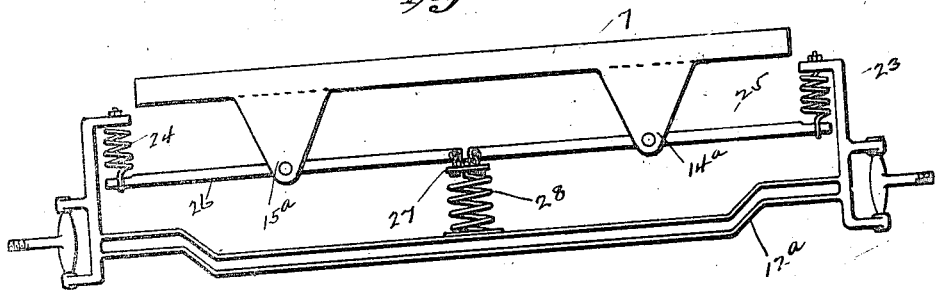
Fig. 4.
Fig. 3.
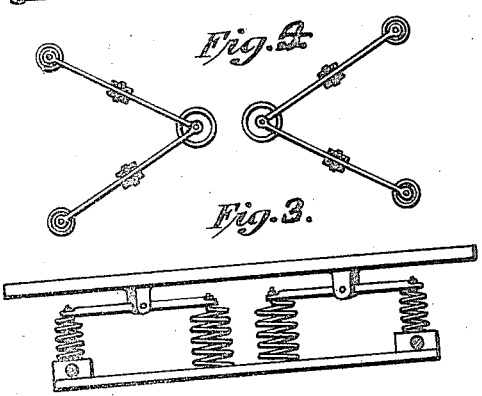
Inventor:
William R. Williams
by Wm. J. Dolan, Atty.
Attest:
C. O. Mitchell
R. R. Murphy

UNITED STATES PATENT OFFICE.

WILLIAM R. WILLIAMS, OF NEW YORK, N. Y., ASSIGNOR TO CATHERINE EMILY WILLIAMS, OF BAKERSFIELD, CALIFORNIA.

VEHICLE SUSPENSION.

1,211,513.   Specification of Letters Patent.   Patented Jan. 9, 1917.

Application filed January 22, 1912. Serial No. 672,769.

*To all whom it may concern:*

Be it known that I, WILLIAM R. WILLIAMS, a citizen of the United States, and a resident of New York, county and State of New York, have invented certain Improvements in Vehicle Suspensions, of which the following is a specification.

The invention relates to vehicle suspensions; and, while it may be applied to vehicles generally, it is particularly applicable to road vehicles of heavy weight and designed to move at high speed, as motor cars.

Objects of the invention are to provide an improved form of vehicle suspension in which the flexibility of the elastic elements or springs may be greatly increased without in any degree decreasing the stability of the vehicle; which shall be simple, durable, and economical in construction and highly efficient in operation; and whose parts shall be few, accessible, and easy of application. These and other objects of the invention will in part be obvious and in part be more fully explained in the following description.

The invention consists in the novel improvements, parts, combinations, and features of construction herein shown and described.

In the accompanying drawings, which are referred to herein and form a part hereof, are illustrated several embodiments of the invention, the same serving in connection with the description herein to explain the principles of the invention.

Of the drawings: Figure 1 is an elevation of a portion of the front of a motor car, showing an embodiment of the invention applied thereto; Fig. 2 is a similar view of a modification; Fig. 3 is a fragmentary side elevation of a modification showing the same as applied to the running gear and chassis of a motor car; Fig. 4 is a fragmentary plan view of the same.

Referring now in detail to the drawings, there is shown in Fig. 1 a portion of the chassis 7 of a motor car.

As ordinarily constructed, the car is provided with springs to give a certain degree of ease of motion to the vehicle. In order, however, to insure the stability of the suspended portion or body of the vehicle, these springs must be very rigid. This rigidity constitutes a serious defect in motor vehicles in which a high degree of ease of motion is desirable but which is prevented by this rigidity of the springs or elastic elements.

In the construction illustrated in Fig. 1, the chassis is mounted upon springs 8 and 9 which extend transversely of the vehicle body and which are connected at their outer ends by shackles 10 to the axle 12 and which, as shown, are respectively pivotally mounted at their center portions in bearings 14 and 15 extending downwardly from the chassis 7. The degree of rigidity of the springs of the usual suspension above alluded to may be represented by the springs 8 and 9, as heretofore arranged. To give the desired degree of ease of motion to the vehicle, when running at high speed or upon encountering inequalities of road surface, the springs may be made more flexible or the elastic means may be amplified. With springs made more flexible and applied in the ordinary manner, however, while great ease of motion would be imparted, the suspended portion of the vehicle would tilt laterally or sway from side to side in a very dangerous manner upon shifting of the load or upon encountering inequalities in the road surface.

The elastic means may be amplified, however, without any attending excessive lateral tilting of the body of the vehicle, if the vehicle suspension is so constructed and arranged that the instability which would otherwise be caused by the addition of extra springs or amplification of the elastic means is eliminated by causing portions of elastic elements which act on opposite sides of the vehicle to be mutually affected by any stress communicated to one member. Therefore, the springs 8 and 9 are connected by shackles 17 and 18 to a third elastic element or spring 19 which, as shown, is arranged transversely of the chassis to which it is secured by bearings 21. It will be noted, however, that the springs are so connected as to be mutually affected by flexing of the third spring, and to this end and in accordance with one feature of my invention, each of the opposite springs 8 and 9 is connected to the third elastic element 19 at the point marking the limit of flexibility which, without said connection could be permitted in either of said springs 8 and 9 without affecting the equilibrium of the vehicle body. By making the connection between the springs 8 and 9 in this manner, the third elastic element or spring 19 can be amplified to give the desired additional ease of motion to the vehicle and yet the stability of the suspended portion of the vehicle will not be affected or impaired, the oppositely disposed springs supporting the vehicle being affected by any stress communicated to either. It will also be noted that in Fig. 1, these limiting points in the springs 8 and 9 are shown as closely adjacent. In this way, approximately parallel motion will be imparted to the suspended portion of the vehicle to the extent of movement due to the flexing of spring 19; and, while said body will be free to move vertically or up and down to a degree to insure the desired ease of motion, this motion will always, to said extent, be approximately parallel. It will also be noted that the suspension thus described can be duplicated at the rear of the car.

In Fig. 2 is illustrated a modification in which the elastic elements supporting the vehicle consists, as shown, of vertically disposed helical springs 23 and 24 suitably secured to the running gear and of levers 25 and 26 connected to the respective springs 23 and 24 and extending transversely of the chassis 7 to which the levers are connected by being pivoted in bearings 14ª and 15ª. It will be obvious that the levers 25 and 26 with their connected springs 23 and 24 perform the same function as the springs 8 and 9 of Fig. 1. It will also be noted that the levers 25 and 26 are connected at their inner ends by a common connecting member 27 to a third elastic element or spring 28, and this connection is made at the point marking the limit of elasticity which, without said connection, can be given to either of said elastic elements comprising the lever and helical spring. It will further be noted that the two elastic elements have a common point marking said limit of elasticity and that said connection with the third elastic element is preferably made at this point, but may be made at any point not exceeding the flexibility which can be given to each of said first two elements without affecting the equilibrium of the vehicle body. It will also be noted that the third elastic element or spring 28 is connected to the axle 12ª instead of being arranged between the first two elements and the chassis, as in the embodiment illustrated in Fig. 1.

While in the embodiment of the invention illustrated in Fig. 2, the elastic supporting elements are shown arranged transversely of the vehicle body, in Figs. 3 and 4 the levers of the elastic elements are shown as disposed diagonally of the vehicle body in pairs, one pair supporting the front portion of the vehicle body and another pair the rear portion of the body. It will be noted that the third elastic elements of the respective pairs of supporting elements are closely adjacent.

It will be seen that a vehicle suspension constructed in accordance with this invention will carry out the objects of the invention, as heretofore mentioned, while possessing other advantages which will be apparent to those skilled in the art.

The invention in its broader aspects is not limited to the precise construction shown and described, nor to any particular construction by which the same may be carried into effect, as many changes may be made in the details without departing from the main principles of the invention and without sacrificing its chief advantages.

I claim:

1. A vehicle suspension including in combination, a pair only of elastic supporting elements arranged in coöperative relation with the body and an axle of a vehicle, said elements being connected at their outer ends with the opposite ends of the axle and pivotally attached at their centers to the body, a third elastic element, and means connecting said pair of elastic elements at their inner ends with said third elastic element, the connection being made to each of said pair of elastic elements at the point marking the limit of elasticity which without said connection can be given to said elastic element without affecting the equilibrium of the vehicle body.

2. A vehicle suspension including in combination, a pair only of elastic supporting elements arranged in coöperative relation with the body and an axle of a vehicle, said elements being connected at their outer ends with the opposite ends of the axle and pivotally attached at their centers to the body, a third elastic element, and means connecting said pair of elastic elements at their inner ends with said third elastic element, said pair of elastic elements having a common point of connection to said third element, and said point marking the limit of elasticity which without said connection can be given to each of said pair of elements without affecting the equilibrium of the vehicle body.

3. A vehicle suspension including in combination, a plurality of elastic supporting elements arranged in coöperative relation with the body and an axle of a vehicle, said elements being connected at their outer ends with the opposite ends of the axle and pivotally attached at their centers to the body, a third elastic element, and means connecting said plurality of elastic elements at their inner ends with said third elastic element, the connection being made to each of said plurality of elastic elements at the point marking the limit of elasticity which without said connection can be given to said element without affecting the equilibrium of the vehicle body.

4. A vehicle suspension including in combination, a pair only of elastic supporting elements arranged in coöperative relation with the body and an axle of a vehicle, said elements being connected at their outer ends with the opposite ends of the axle, each elastic element comprising a spring and a lever, and a third elastic element connecting the inner ends of said first named elements, each lever being connected to said third elastic element and the elasticity of each of said pair of elastic elements being the maximum which without the connection to the third elastic element can be imparted to said member without affecting the equilibrium of the vehicle body.

5. A vehicle suspension including, in combination, a pair of resilient members located in an intermediate plane substantially parallel to the vehicle body and a supporting axle, said members being connected with opposite parts of the axle at their outer ends and pivotally attached at their centers to the body, and an elastic element linked to the inner ends of both members so as to control movement of either member relatively to the other.

6. A vehicle suspension including in combination and in coöperation with the body, axle and running gear of a vehicle, a plurality of springs connected with opposite ends of the axle, levers pivotally mounted on the body of the vehicle and a third elastic element, said levers connecting said springs and said third elastic element and said springs having a common limit of flexibility, substantially as described.

7. A vehicle suspension including in combination, a pair only of elastic elements arranged in coöperative relation with the body and an axle of a vehicle, said elements being connected at their outer ends with the opposite ends of the axle and pivotally attached at their centers to the body, a third elastic element, and means connecting said pair of elastic elements at their inner ends with said third element, the connection being made to each of said pair of elements at a point not exceeding the limit of elasticity which without said connection can be given to said elastic element without affecting the equilibrium of the vehicle body.

8. A vehicle suspension including in combination, a pair only of elastic supporting elements arranged in coöperative relation with the body and an axle of a vehicle, said elements being connected at their outer ends with the opposite ends of the axle and pivotally attached at their centers to the body, a third elastic element, and means connecting said pair of elastic elements at their inner ends with said third elastic element, said pair of elastic elements having a common point of connection to said third element, and said point being within the limit of elasticity which without said connection can be given to each of said pair of elements without affecting the equilibrium of the vehicle body.

9. A vehicle suspension including in combination, a pair of springs arranged at opposite ends of an axle, a third spring arranged midway of said axle, and a lever arranged between each of said pair of springs and said third spring and pivotally mounted on the vehicle body, substantially as described.

10. A vehicle suspension including, in combination and in coöperation with the vehicle body and an axle, a plurality of elastic members connected with opposite ends of the axle and having each an intermediate pivotal connection with the body, and an elastic element joining said members between their respective pivotal connections and permitting relative vertical movement of the body and axle.

In testimony whereof, I have signed my name to this specification, in the presence of two subscribing witnesses.

WILLIAM R. WILLIAMS.

Witnesses:
Frances Kinreich,
Raphael R. Murphy.